(12) United States Patent
Mohamadi

(10) Patent No.: US 9,383,426 B2
(45) Date of Patent: Jul. 5, 2016

(54) REAL-TIME, TWO DIMENSIONAL (2-D) TRACKING OF FIRST RESPONDERS WITH IDENTIFICATION INSIDE PREMISES

(71) Applicant: Farrokh Mohamadi, Irvine, CA (US)

(72) Inventor: Farrokh Mohamadi, Irvine, CA (US)

(73) Assignee: Farrokh Mohamadi, Irvine, CA (US)

( * ) Notice: Subject to any disclaimer, the term of this patent is extended or adjusted under 35 U.S.C. 154(b) by 210 days.

(21) Appl. No.: 14/069,237

(22) Filed: Oct. 31, 2013

(65) Prior Publication Data
US 2015/0077282 A1    Mar. 19, 2015

Related U.S. Application Data

(60) Provisional application No. 61/879,034, filed on Sep. 17, 2013.

(51) Int. Cl.
| | | |
|---|---|---|
| G01S 13/04 | (2006.01) | |
| G01S 13/74 | (2006.01) | |
| G01S 13/56 | (2006.01) | |
| G01S 13/78 | (2006.01) | |
| G01S 1/02 | (2010.01) | |
| G01S 5/10 | (2006.01) | |
| G01S 19/13 | (2010.01) | |
| G01S 7/41 | (2006.01) | |
| G01S 13/02 | (2006.01) | |
| G01S 13/88 | (2006.01) | |
| G01S 5/14 | (2006.01) | |

(52) U.S. Cl.
CPC ... *G01S 1/02* (2013.01); *G01S 5/10* (2013.01); *G01S 7/415* (2013.01); *G01S 13/0209* (2013.01); *G01S 13/74* (2013.01); *G01S 13/888* (2013.01); *G01S 19/13* (2013.01); *G01S 5/14* (2013.01); *G01S 13/04* (2013.01); *G01S 13/56* (2013.01); *G01S 13/78* (2013.01)

(58) Field of Classification Search
CPC .................. G01S 13/04; G01S 13/56; G01S 13/78–13/788
USPC .......................... 342/27, 28, 42–51, 176, 179
See application file for complete search history.

(56) References Cited

U.S. PATENT DOCUMENTS

| | | | | |
|---|---|---|---|---|
| 5,606,574 A | * | 2/1997 | Hasegawa | G01S 13/782 342/42 |
| 5,959,568 A | * | 9/1999 | Woolley | G01S 5/0289 235/385 |
| 6,177,903 B1 | * | 1/2001 | Fullerton | G01S 7/003 342/21 |
| 6,198,394 B1 | * | 3/2001 | Jacobsen | A61B 5/1112 340/10.1 |
| 7,034,678 B2 | * | 4/2006 | Burkley | G01S 5/0027 340/539.11 |
| 7,091,852 B2 | * | 8/2006 | Mason | G01C 21/206 340/523.11 |

(Continued)

*Primary Examiner* — Peter Bythrow
(74) *Attorney, Agent, or Firm* — Haynes and Boone, LLP

(57) ABSTRACT

A combination of active reader tags and ultra wideband (UWB) radar systems provide real-time monitoring of first responders, with identification of each team member using active tags, and detection of victims or other subjects using motion or breathing detection, in a field of operations such as a building affected by fire or hazardous material or search and rescue mission area. Initially, a cluster of miniaturized radars (sensors) act in a static mode of operation, gathering static radar information used to depict a constructed layout of the premises. The cluster of radars then operate in a dynamic mode that detects motion or breathing of multiple subjects inside the field of operations. With dual mode operation the system can read the active tags identification, and by triangulation, display the position of each first responder with its identification and positions of subjects on a composite image of the constructed layout.

18 Claims, 14 Drawing Sheets

(56) References Cited

U.S. PATENT DOCUMENTS

| | | | | |
|---|---|---|---|---|
| 7,245,216 B2 * | 7/2007 | Burkley | H04W 76/007 | 340/539.11 |
| 7,633,387 B2 * | 12/2009 | Carmichael | A62C 99/00 | 340/519 |
| 7,924,149 B2 * | 4/2011 | Mendelson | G01C 21/206 | 340/539.11 |
| 7,952,512 B1 * | 5/2011 | Delker | G01S 13/825 | 342/126 |
| 7,970,534 B2 * | 6/2011 | Loftus | G01C 21/20 | 340/539.13 |
| 8,314,731 B2 * | 11/2012 | Fretenburg | G01S 13/325 | 342/118 |
| 8,558,893 B1 * | 10/2013 | Persson | G08B 13/19684 | 348/151 |
| 8,624,774 B2 * | 1/2014 | De Rosa | G01S 13/765 | 342/118 |
| 8,688,375 B2 * | 4/2014 | Funk | G01C 21/165 | 340/995.19 |
| 8,760,520 B2 * | 6/2014 | Levin | G06Q 10/06 | 340/10.1 |
| 2005/0231425 A1 * | 10/2005 | Coleman | G01C 21/206 | 342/385 |
| 2006/0006995 A1 * | 1/2006 | Tabankin | G08B 13/19656 | 340/521 |
| 2006/0192709 A1 * | 8/2006 | Schantz | G01V 15/00 | 342/125 |
| 2006/0267833 A1 * | 11/2006 | Langford | G01S 5/0252 | 342/174 |
| 2007/0001904 A1 * | 1/2007 | Mendelson | G01C 21/206 | 342/450 |
| 2007/0241965 A1 * | 10/2007 | Kolavennu | G01S 13/876 | 342/465 |
| 2008/0106457 A1 * | 5/2008 | Bartolini | G01S 13/784 | 342/40 |
| 2010/0118149 A1 * | 5/2010 | Levin | G06Q 10/06 | 348/169 |
| 2010/0225520 A1 * | 9/2010 | Mohamadi | G01S 7/032 | 342/21 |
| 2010/0321242 A1 * | 12/2010 | Robinson | G01S 3/48 | 342/445 |
| 2010/0321244 A1 * | 12/2010 | Kelly | G01S 3/023 | 342/451 |
| 2011/0046920 A1 * | 2/2011 | Amis | G01S 19/16 | 702/181 |
| 2011/0187591 A1 * | 8/2011 | Walker, Sr. | G01S 19/46 | 342/357.29 |
| 2012/0050101 A1 * | 3/2012 | Whiteman | G01S 5/0027 | 342/357.31 |
| 2012/0130632 A1 * | 5/2012 | Bandyopadhyay | G01C 17/38 | 701/446 |
| 2012/0182172 A1 * | 7/2012 | Sorensen | H04W 4/02 | 342/28 |

\* cited by examiner

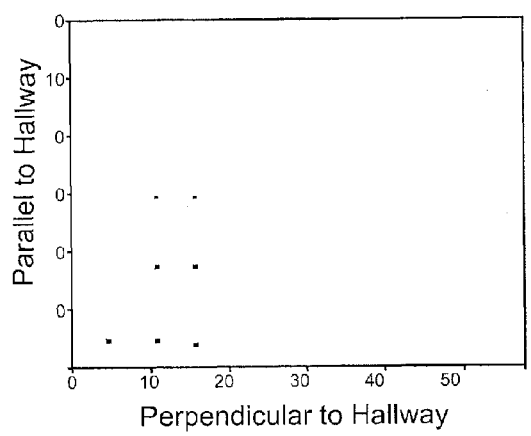
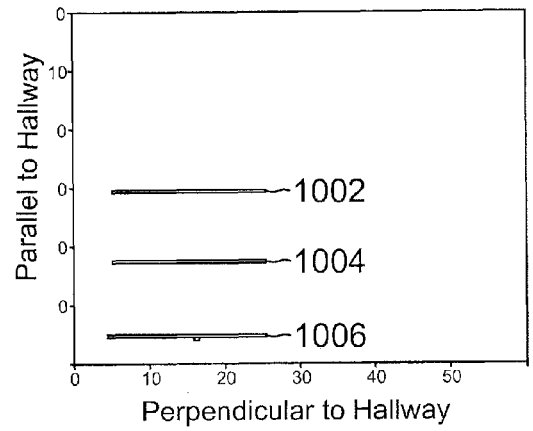
FIG. 11A     FIG. 11B
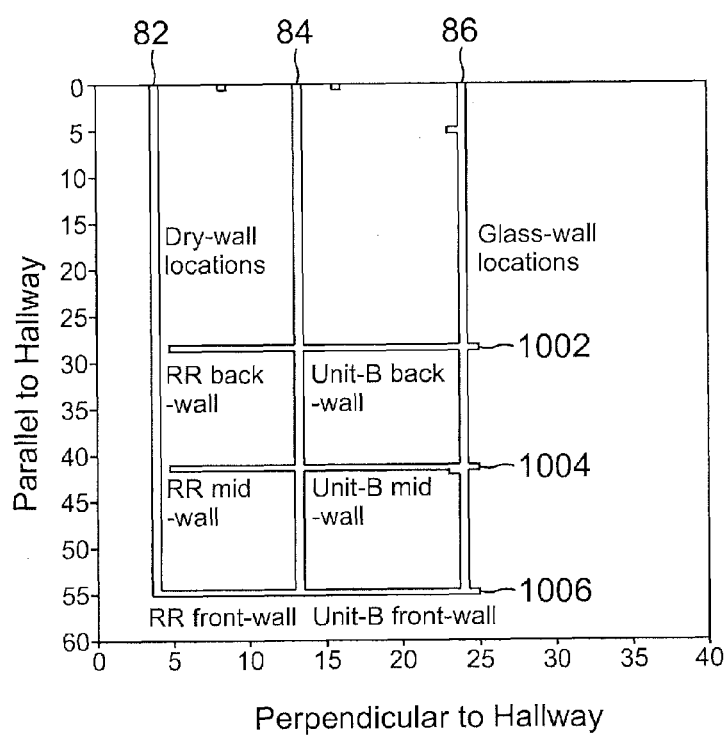
FIG. 12

REAL-TIME, TWO DIMENSIONAL (2-D) TRACKING OF FIRST RESPONDERS WITH IDENTIFICATION INSIDE PREMISES

CROSS REFERENCE TO RELATED APPLICATIONS

This application claims the benefit of priority from U.S. Provisional Patent Application No. 61/879,034, filed Sep. 17, 2013, which is incorporated by reference.

BACKGROUND

Embodiments or the present invention generally relate to radar sensing, personnel monitoring, and communications and, more particularly, to a system combining communications, active tags, and ultra wideband radar to monitor location of team members (e.g., rescue mission operations or first responders to an emergency situation) in real-time with team member identification as well as detection of individuals (e.g., victims) inside premises affected, for example, by fire, hazardous material, or other catastrophe.

There is often a need for detection of people who may be hidden behind or trapped underneath building rubble, concealed behind walls, or obscured by smoke-filled rooms. Such situations can arise, for example, in a war zone when the search may be for hostile individuals, but perhaps more commonly in fire, flood, earthquake, plane crashes, or other catastrophes, when the search is for victims whose lives may be in danger and for whom the time it takes to be found may be critical. For combat teams, and all the more so for urban and other search and rescue teams, a number of sensing capabilities and technologies have been developed such as canines, listening devices, and video cameras to detect the presence of living victims who may be hidden and trapped or otherwise unable to move. A need exists, however, for tracking the whereabouts of and communicating with team members, such as those of emergency first responders such as fire, medical, and search and rescue teams.

BRIEF DESCRIPTION OF THE DRAWINGS

FIG. 11A and FIG. 11B are a pair of displays showing estimated and interpolated wall coordinates obtained from marker locations shown in FIG. 10 in accordance with one embodiment;

FIG. 12 is a display showing estimated wall locations based on combining the images from displays shown in FIG. 9A and FIG. 9B and FIG. 11A and FIG. 11B in accordance with one embodiment;

Figure 1:
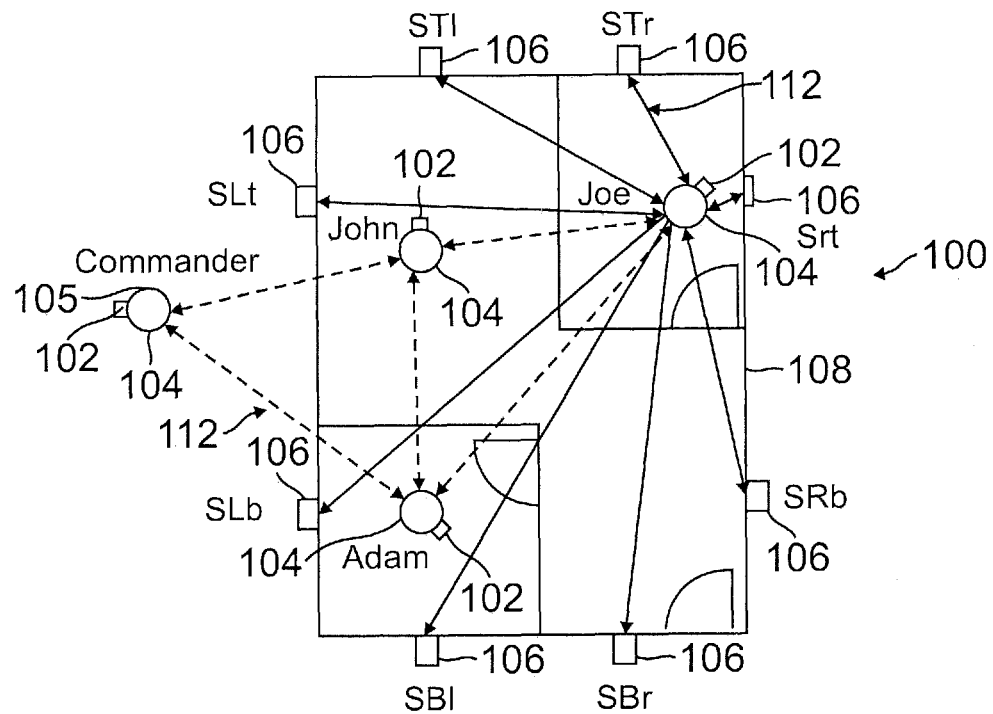
FIG. 1 is a system block diagram illustrating a tracking and communications system for first responder teams in accordance with an embodiment.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Methods and systems are disclosed to address the need for a wireless system to virtually connect first responder team members to their team leaders and incident commanders. In one embodiment, an alert may be triggered at the team-leader and incident-commander levels if a team member moves too far away from a team leader. One or more embodiments may enable emergency first responders to conduct more efficient searches while maintaining team integrity and may also help prevent first responder team members from getting separated from other team members and team leaders.

A combination of active reader tags and ultra wideband (UWB) radar systems provide real-time monitoring of positions of first responder teams, with identification of each team member using active tags, and detection of victims or other subjects in a field of operations such as a building affected by fire or hazardous material or search and rescue mission area. In an initial mode of operation, a cluster of miniaturized radars (sensors) act in a static mode, gathering static radar information used to depict a constructed layout of the premises. The cluster of radars then operates in a dynamic mode that detects motion, breathing, or heartbeat of multiple individuals inside the field of operations. With dual mode operation capability the system also can read the active tags information affixed to each first responder. By triangulation, the position of each first responder with its identification information is displayed on a composite image of the constructed layout. Instantaneous movement and breathing detection of entrapped individuals are also displayed, identifying location of first responders and victims or other subjects. The two dimensional display mapped on the layout provides the rescue operation status in real-time.

One or more embodiments implement an integrated networked hardware and software system (e.g., system 100) that helps first responders (e.g., firefighters, search and rescue) incident commanders and team leaders to maintain team integrity within the field of operations (e.g., a fire ground or search area). System 100 may be composed of ultra wideband (UWB) remote breathing detection sensors (e.g., sensors 106) and a wearable UWB radio (e.g., communicator units 102) with integrated micro-processor and a goggle with head mountable display (HMD). The communicator device 102 may provide the first responder a wearable radio and wireless HMD mini display unit. The combination of networked UWB motion detection sensors (e.g., sensors 106) and the wearable radio-display units (e.g., communicator units 102) helps ensure safety of team members by providing real-time situational awareness to the incident commander, team leader, and team members who have moved into an operations area that is visually obscured by walls, smoke, fog, or dust.

The UWB radar units (e.g., sensors 106) may comprise miniature portable radar weighing less than 5 pounds (lb.) that performs static and dynamic radar functions around the inside or outside of a premises, while the wearable UWB radio devices (e.g., communicator units 102) may weigh less than 2 lbs. and perform radio and display functions for each individual first responder. Upon placing the UWB radar sensors outside and inside a premises, e.g., a building structure, the software and hardware platform of system 100 can construct a complete layout of the premises in a static mode of operation on-demand by a commander or team leader. Upon completion of the optional layout image construction in less than 3 minutes, the same sensors may switch to their default dynamic mode of operation, where motion of individuals is sensed and displayed in two dimensions (e.g., a plan view) in real-time. Each first responder's mini-screen head mount display and the commander's view of the displayed screen can be seen whether inside or outside of the premise. In one embodiment, a communicator unit 102 may be mountable on a self contained breathing apparatus (SCBA), sometimes referred to as a compressed air breathing apparatus (CABA), helmet, or can be worn so that it allows viewing the two-dimensional (2-D) display of the layout constructed by the UWB sensors. Communicator units 102 also may be adaptable to to address identification of users (e.g., first responder team members) in a scalable manner so that the size of first responder teams need not be limited. In one or more embodiments, communicator units 102 also may manage voice over internet protocol (VOIP). Communicator units 102 may operate on UWB (3-8 GHz) IEEE 802.15 and narrow-band (2.4 GHz) IEEE 802.11 as an open standard compliant radio.

In brief, one or more embodiments may implement integration of fully networked UWB sense-through-the-wall (STTW) sensors (e.g., sensors 106) to construct a layout of a premises and superimpose movement of the individuals (both first responders and subjects of search such as victims) inside. One or more embodiments may include communicator unit devices as a wearable, standard battery operated system to display to team members their relative positions in two dimensions, overlaid on the layout of the premises, and to manage communication between peers. One or more embodiments may include integrating first responder team member identification display and VOIP capabilities to identify first responders on the 2-D display screen. One or more embodiments may include an initial ad-hoc network that can be enhanced to the IEEE 802.11 a-c, providing high-throughput wireless local area networks (WLANs) on the 5 GHz band by the 802.11 Working Group final standard ratification.

FIG. 1 illustrates a tracking, identification, and communications system 100 for first responder teams, in accordance with an embodiment. System 100 may include wearable communicator units 102 for each team member 104, team leader 104, and incident commander 105 (also collectively referred to as team members 104). System 100 may include two-dimensional (2-D) sensors 106 that may be placed at suitable positions for scanning a field of operations, such as, in this example, building 108. Sensors may be located at various locations around the perimeter of building 108, as seen in FIG. 1. Sensors may also be located on a roof, for example, by being positioned by drones or unmanned aerial vehicles (UAV), not shown in FIG. 1. As shown in FIG. 1, a team commander 105 may be stationed outside building 108, while other team members 104 may be moving about inside building 108. Sensors 106 may include, for example, radar capability that can "see" through walls in order to provide the displays to team members 104 on wearable communicator units 102, examples of which are shown in FIGS. 2 and 3.

FIG. 1 also illustrates a wireless link 112 between sensors 106, first responders 104 and outside observation command unit (e.g., commander 105). Each sensor 106 may provide a unique code that is deciphered by the processor of each communicator 102 on a first responder 104. The ad-hoc connection maps the position of other responders 104 and may be displayed on a layout composite such as the display 120 shown in FIG. 2, or the display 130 shown in FIG. 3.

Figure 2:
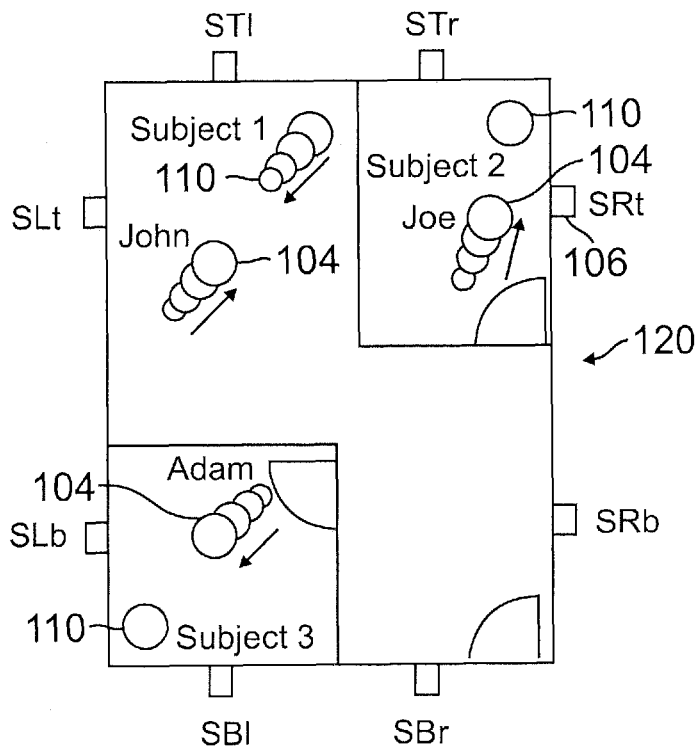
FIG. 2 is a diagrammatic illustration of a display shown on a real-time persistent display screen of a wearable communicator unit of a tracking and communications system such as that shown in FIG. 1, in accordance with an embodiment.
Figure 3:
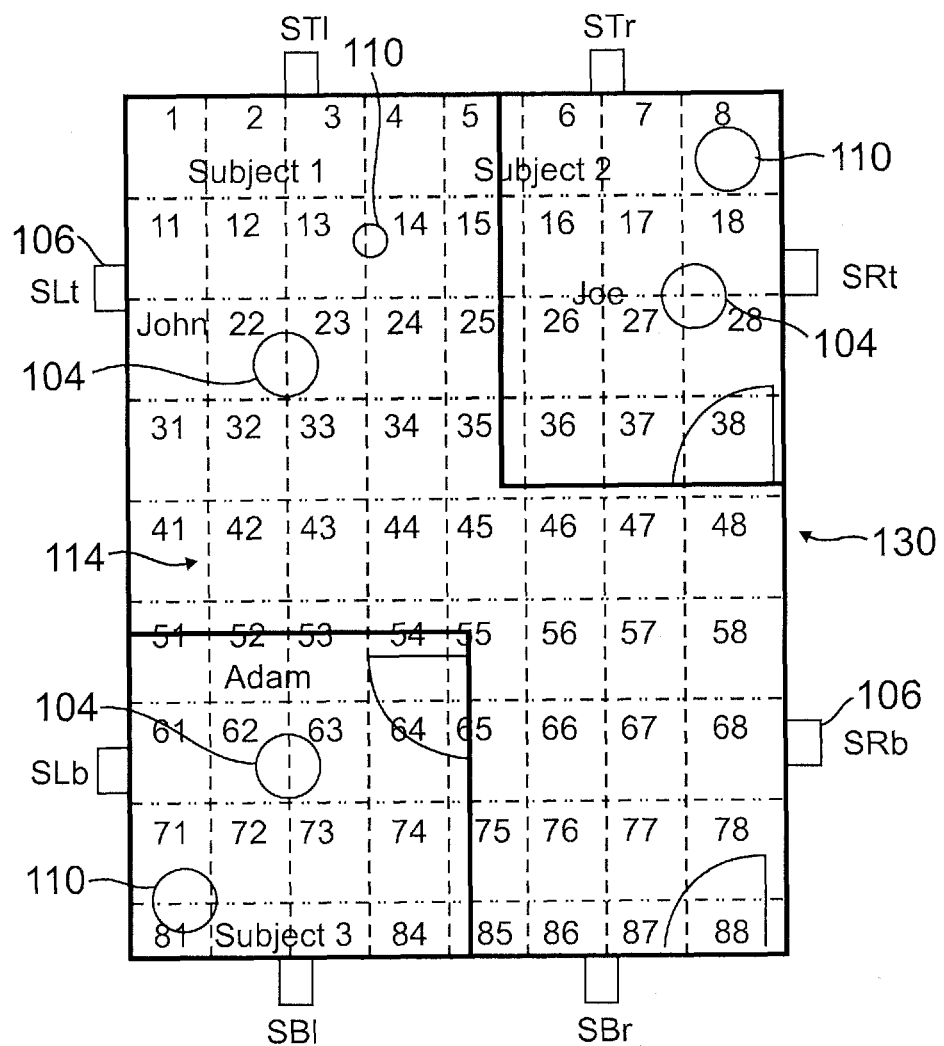
FIG. 3 is diagrammatic illustration of a location grid display shown on a display screen of a wearable communicator unit of a tracking and communications system such as that shown in FIG. 1, in accordance with an embodiment.

FIG. 2 illustrates an example of a display 120 that may be shown to a team member 104 on one of the wearable communicator units 102 in the example of a particular field of operations as shown in FIG. 1. As seen in FIG. 2, the display may show a diagram of the layout of the field of operations, in this case the display shows the layout of building 108 including interior and exterior walls as mapped by sensors 106 operating in an initial static mode. The display for each team member may also show the dynamic position of each team member 104 persistently and subjects 110 that are being searched for.

FIG. 2 shows, on an example display 120 of each responder's display screen presented on their HMD communicator unit 102, the instantaneous position with identification (e.g., Joe, John, Adam) of each responder 104. FIG. 2 also shows the position and movement of the unidentified individuals, e.g., subjects 110. The combined display of first responders 104 and subjects 110 can provide valuable information about the presence of entrapped victims in smoke or dusty environments. A persistent coloring may be used to indicate the latest position of a first responder 104 or subject 110 with respect to the sensors 106 with an indicator trail, as shown, that may help a viewer of display 120 identify movement. Screen display 120 may be displayed to each responder 104 and the commander 105 via a network, e.g., wireless link 112. Positions may be marked with a location indicator, as shown, with or without trails to show movement.

FIG. 3 illustrates another example of a display 130 that may be shown to a team member 104 on one of the wearable communicator units 102 in the example of a particular field of operations as shown in FIG. 1. As seen in FIG. 2, the display may show a diagram of the layout of the field of operations, in this case the display shows the layout of building 108 including interior and exterior walls as mapped by sensors 106 operating in an initial static mode. The display for each team member may also show the position of each team member 104 and subjects 110 that are being searched for.

FIG. 3 shows, on display 130, an example of one of the screens to locate first responders 104 and entrapped individuals (subjects) 110. Due to insensitivity of GPS, a more cost effective accurate locator may be required to indicate position of each responder 104 as well as victims 110. The locator may, for example, compute positions by triangulation from the locations of the sensors 106 so as to show locations of sensors, first responders, and subjects on a grid 114. A screen display such as display 130 can facilitate movement of the first responders 104 to positions that are directed by the commander (or lead officer) 105.

Figure 4:
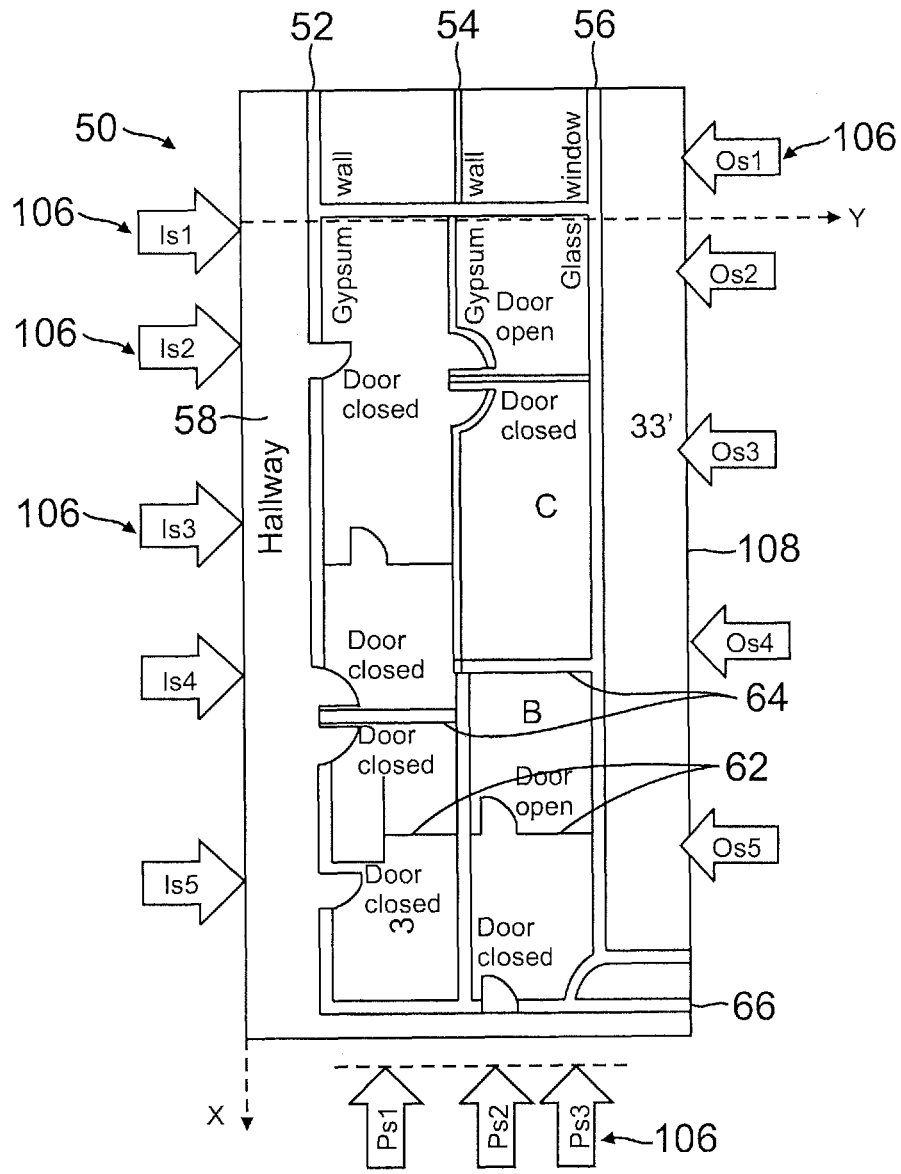
FIG. 4 is a building floor plan showing sensor placement for detection of inside walls for a tracking and communications system for first responder teams, in accordance with an embodiment.

FIG. 4 illustrates combined static and dynamic scan capability of sensors 106 of system 100 for constructing, in real-time, the layout of a premises and motion of the subjects inside. Sensors 106 may be implemented using a module housing a UWB, high-performance, portable radio-frequency imaging system which enables detection of solid items or liquid layers underground or otherwise concealed, whether stationary or in state of motion. Such UWB radar modules have proven effective for (a) an underground TED detection sensor system with a field of view (FOV) of 140 degrees; (b) a portable hand-held unit with FOV 140 degrees; and (c) a robot mountable remote sensor system with FOV 30 degrees. In each version, the module's scanner transmits sub-nanosecond pulses that can penetrate and be reflected in the ground, concrete, wood, vinyl, and other solids or from the surface of liquid items for purposes of "sensing" them.

The low power UWB module may utilize pulses in the license free 3 to 8 GHz band with 5 GHz bandwidth compliant to the FCC Annex K power spectrum, for example. The UWB module's pulse detector receives the "bounce-back" signals from the transmitter and builds the image of the reflections for classification based on the size of an object (e.g., effective cross section). The ultra sensitivity to detect concealed motion is enabled by the UWB radar's precision edge detection scheme that provides very accurate signature of motion. The depth resolution capability of the system is about 3 picaseconds (electromagnetic waves travel at the speed of 1 ft. per nano-second in no clutter free space) that can detect chest movement during breathing at 60 ft. away behind a wall. The system also can detect breathing behind a barrier or inside a 40 ft. cargo container.

For example, sensors 106 may include an impulse radar transmitter that transmits narrow radio frequency (RF) pulses at a certain pulse repetition frequency (PRF). For example, the transmitter of radar sensor 106 may emit RF radiation in the form of rapid wideband (narrow width) radar pulses at a chosen pulse repetition frequency (PRF) in the 1-10 GHz band. The pulses can penetrate, for example, soil, glass, wood, concrete, dry wall, and bricks with varying attenuation constant. By choosing a PRF in the range of 10-100 MHz, for example, and appropriate average transmitter power, a surveillance range of approximately 5-50 feet can generally be achieved. The radar system 106 may, for example, transmit Gaussian pulses as short as 100 picoseconds wide with center frequency in the 1-10 GHz band. The transmitter may employ a wafer scale antenna and wafer scale beam forming as disclosed in U.S. Pat. No. 7,312,763, issued Dec. 25, 2007, to Mohamadi and U.S. Pat. No. 7,548,205, issued Jun. 16, 2009, to Mohamadi and virtual beam forming as disclosed in U.S. Pat. No. 8,237,604, issued Aug. 7, 2012, to Mohamadi et al., all of which are incorporated by reference. Radar sensor 106 also may include a radar receiver that performs the required signal processing on a reflected response (e.g., reflected pulses) to construct a digitized representation of the target (e.g., walls, rubble, first responders, victims). In the receiver, amplitude and delay information may be extracted and digitally processed.

In one embodiment, an extended range sensor has shown that movement can be detected on the outside of a building through two walls (e.g., an adobe and a stucco wall) out to 60 feet from the radar, with the sensor 106 placed along the adobe wall. An enhanced (4 times larger antenna) version of sensor 106 effectively detected movement in the building through four different wall types (including cinder block and stucco walls), as well as outside the building through two walls. Movement was detected out to 126 feet from the radar sensor 106, looking through the adobe and stucco walls with a sensor 106 placed against the adobe wall. Movement was detected out to 60 feet from radar, looking through the cinder block wall and slump block wall with the radar placed against the cinder block wall. More than 400 ft. open space line-of-site motion can be detected.

In summary, the relevant technology of sensor 106 modules may include: 1) a wide spectrum of frequencies used in UWB detection system that can provide a very sensitive motion detection. Doppler radar cannot be as sensitive as it focuses on a single or multi-frequency motion processing; 2) a combination of UWB RF sensor with highly directional beams that is effective for detecting concealed persons as it can detect as little as a few millimeters of chest movement; 3) total weight of unit including 2 hours back up battery for power failure is about 5 lbs., measures, for example, 8 inches (in) by 8 in by 4 in, and is readily mountable on a tripod or attached to a desired platform.

Returning to FIG. 4, a building floor plan, e.g., of building 50, shows data collection locations (e.g., positioning of sensors 106) for detection of inside walls, for example, of building 50. FIG. 4 shows a scenario for data collection at multiple positions around a typical office space, e.g., building 50. Note that the floor-plan may not be drawn to scale, and is for illustration purposes only. An image grid having an origin O, a Y-axis running across the page, and an X-axis running down the page are indicated in FIG. 4. The walls 52, 54, running parallel and walls 62, 64, 66 running perpendicular to the long hallway 58 are made of gypsum, whereas the walls 56 on the opposite side are made of glass (typical glass windows). Building 50, which may be an office space, for example, may have doors that are made of wood, some of which are open as raw data is collected, as indicated in FIG. 4.

At least three sparse locations are necessary on each side of the building 50 for wall mapping. The arrows labeled Is1, Is2, Is3, Is4 and Is5, with arrow-head pointing in the direction of radar range, indicate five radar scan locations, e.g., from the exterior of building 50. The separation between Is1-Is2, Is2-Is3, Is3-Is4, Is4-Is5 for this example are respectively 5 ft, 17 ft, 29 ft and 43 ft. The scan locations on the opposite side of the building are indicated by arrows labeled Os1, Os2, Os3, Os4 and Os5, with arrow-head pointing in the direction of radar range. The separation between Os1-Os2, Os2-Os3, Os3-Os4, Os4-Os5 are also for this example respectively 5 ft, 17 ft, 29 ft and 43 ft. There is, however, a 5 ft offset between the Is1-Is5 and the Os1-Os5 sets. The scan locations perpendicular to the hallway 58 (e.g. scan locations are spaced apart in the Y direction) are indicated by arrows labeled Ps1, Ps2, and Ps1, with arrow-head pointing in the direction of radar range, and for this example with 5 ft separation each between Ps1-Ps2 and Ps2-Ps3. All the scan locations for this example are at 5 ft stand-off distance from the walls to the portable radar system 100 which is hand held at 5 ft above the ground. Raw data over a range of 1 through 33 ft with 12.7152 picosecond time step and 10 MHz pulse repetition frequency (PRF) may be collected by system 100 using radar scanning software known in the art. The system 100 (e.g., radar unit 102) may be tilted back and forth by an angle up to about 15 degrees in order to ensure that stronger return signals are captured over the tilt angle range, as opposed to keeping the radar unit 102 completely static. At each scan location (e.g., Is1, Is2, Is3, Is4, Is5, Os1, Os2, Os3, Os4, Os5, Ps1, Ps2, and Ps3) multiple waveforms are recorded using an envelope detector filter in the system 100 scanning software. Multiple waveforms (e.g., 30 for the present example) collected at a given scan location can be used to perform an integration of multiple waveforms to give an improved signal-to-noise-ratio (SNR).

The motivation behind capturing data at opposite sides of the office space of building 50 (e.g., Os1-Os5 on the opposing side of building 50 from Is1-Is5) is to spatially correlate the multiple echoes from the walls and other objects taken from one side (e.g., Os1-Os5) with that observed in the waveforms collected from the other side (e.g., Is1-Is5). The echoes observed later in time (or farther in range) in the Is1-Is5 locations are expected to be spatially correlated with the echoes, stronger and closer in range, in the waveforms measured at locations (Os1-Os5) as long as:

(a) the separation between the Is1-Is5 scan set and Os1-Os5 scan set is less than the maximum unambiguous radar range (30 ft for the present example);

(b) the scan locations Os1-Os5 lie inside the system 100 antenna −10 decibel (dB) beam width overlap with the corresponding locations in the Is1-Is5 scan set or vice versa; and (c) the waveforms at Os1-Os5 scan locations are time aligned with that from the Is1-Is5 scan locations with the a priori knowledge of the physical separation between the two scan location sets (e.g., at least the width of the building 50).

In an actual operational scenario this information on the separation between the two opposite scan locations can be readily obtained. This dual information at opposite sides of the building 50 can give a higher probability of detection and•hence a more reliable mapping of walls and other static, reflective objects inside the space, especially when the SNR can be lower for the data measured from one side. For situations when information is limited to that from only one side of the building 50, the information can still be used for mapping. Data measured at locations Ps1, Ps2, and Ps3 perpendicular to the hallway 58 can provide information of perpendicular walls (e.g., walls 62, 64, 66) and other static objects inside the building 50 that cannot be detected in the data at Is1-Is5 and Os1-Os5 locations.

Figure 5:
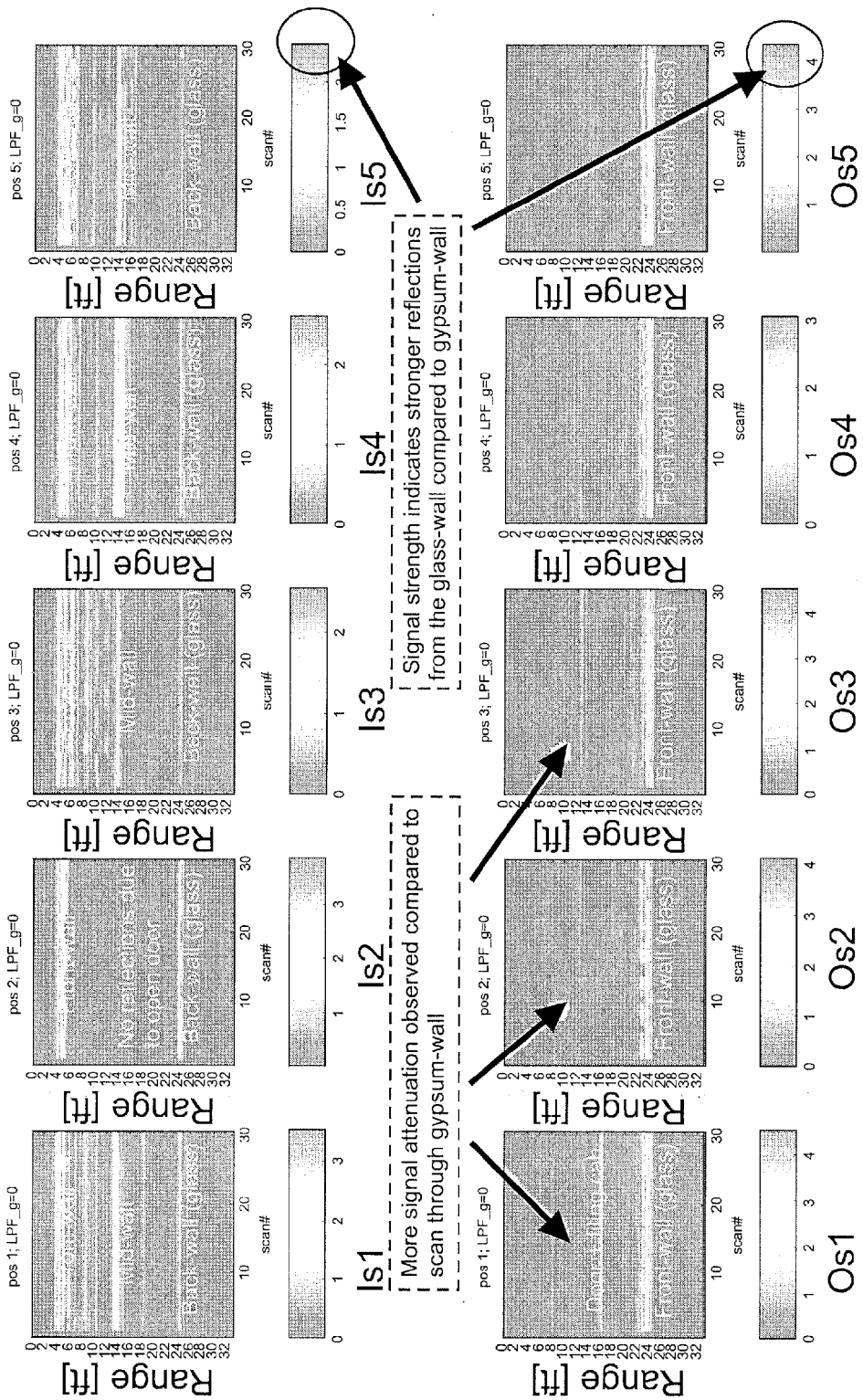
FIG. 5 is a set or signal strength graphs corresponding to a subset of data collection locations of FIG. 4 in accordance with an embodiment.

FIG. 5 is a set of signal strength graphs corresponding to a subset of data collection locations of FIG. 4. Each graph of FIG. 5 shows the envelope of the reflected signal strength as functions of range vs. waveform number (e.g., "scan #", 30 scans) for scan positions at Is1-Is5 and at Os1-Os5. The time-domain responses for the Is1-Is5 scan locations indicate the locations of the walls inside the office space, apart from the outer walls 52, 56 (closest and farthest from the radar locations). The Os-1Os5 plots have been time-reversed to coincide with the same vertical axis of the Is1-Is5 plots. Also, these waveforms have been time adjusted with respect to the Is1-Is5 waveforms with the knowledge of width of the building 50 (e.g., 21 ft). Thus, the two data sets have one common vertical range axis.

The maximum limits of the color bars in the Os1-Os5 plots are higher than that of the Is1-Is5 plots and hence indicate higher reflection coefficient of signals from the glass-wall 56. Also signals at longer ranges, reflected from structures (e.g., walls 54, 62, 64) inside the office space 50, for the Os1-Os5 scan locations indicate lower SNR compared to that through the gypsum-walls 52. This is due to the fact that two-way attenuation constant of plane-waves through glass is 4.0 dB/cm at 5.0 GHz, compared to two-way attenuation of 0.4 dB/cm through gypsum-wall. It is interesting to note that in the "Os1" data, there was an open door positioned at the radar unit 102 boresight and a metallic filing cabinet to the left-side of the radar unit 102 that created stronger echoes at the 16 ft range, and obscured the echo from the mid-wall at 14 ft.

Figure 6:
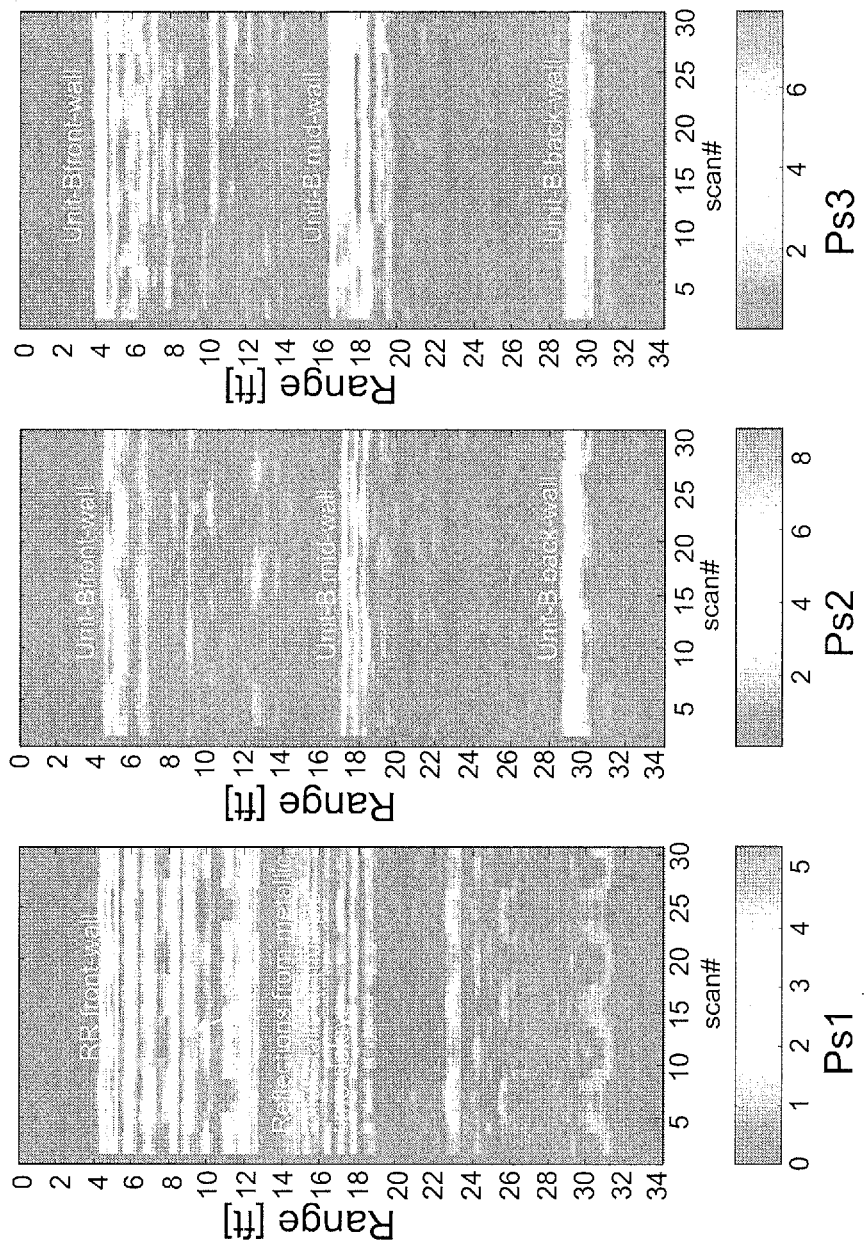
FIG. 6 is a set of signal strength graphs corresponding to another subset of data collection locations of FIG. 4 in accordance with an embodiment.

FIG. 6 is a set of signal strength graphs corresponding to the subset Ps1, Ps2, and Ps3 (perpendicular to the hallway 58) of data collection locations of FIG. 4. Each graph of FIG. 6 shows the envelope of the reflected signals as functions of range vs. waveform number (e.g., "scan #", 30 scans) for scan positions at locations Ps1, Ps2 and Ps3, perpendicular to the hallway 58. An R0.5 range function has been multiplied with the data to compensate for the path loss. The waveforms indicate reflections from metallic toilet aisles at several time delays across the 7-18 ft range. However, waveforms at locations Ps2 (facing a closed door) and Ps3 (facing a gypsum-wall) indicate the presence of mid-wall and back-wall of office space B (see, e.g., FIG. 4). The mid-walls inside the office space C could not be detected because their locations were greater than the unambiguous radar range of 30 ft for system 100. These walls would have been detected if data were available from the office space to the left of C (along negative X-axis in FIG. 4), because they would be less than the 30 ft from the radar unit 102 unambiguous range if scanned from such a location.

Figure 7:
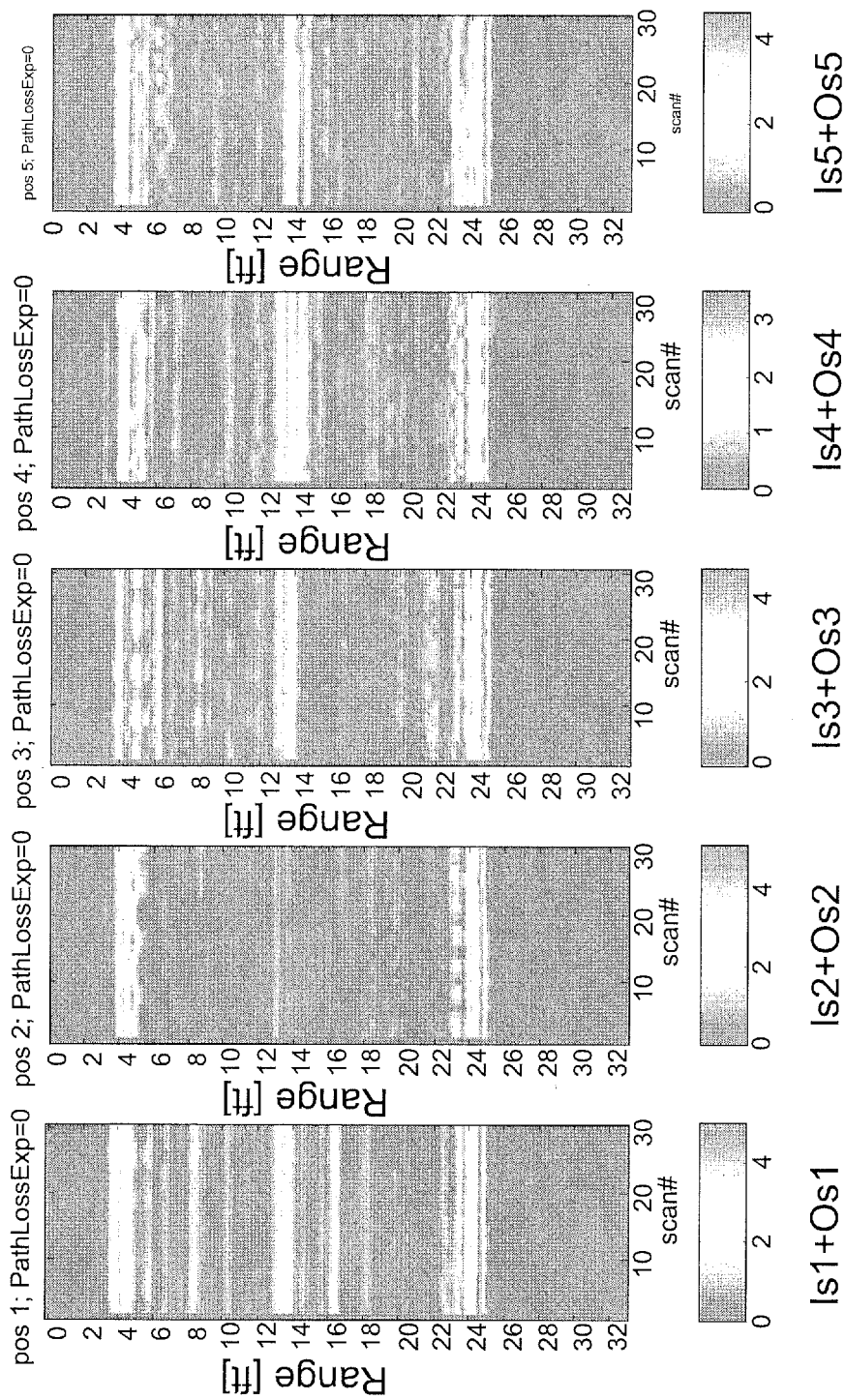
FIG. 7 is a set of signal strength graphs for which an addition has been performed in accordance with an embodiment.

FIG. 7 is a set of signal strength graphs for which an addition has been performed. A key idea behind generating images of walls inside the building 50 involves a combining of spatially coherent reflected signals at multiple range-bins exceeding an appropriate amplitude threshold, that are observed from multiple, sparse scan locations such as Is1-Is5, Os1-Os5, and Ps1-Ps5. More scan locations at a given side of the building 50 will generally yield more reliable estimation of the wall locations perpendicular to the radar down-range, as long as the interior walls are not shadowed by other strong scattering objects (e.g. furniture, or cabinets, for example).

If data are available from the two opposite sides of the building 50 (e.g., Os locations and Is locations), then the data can be summed to enhance the wall detection, after appropriate time alignment of the two data sets. The results after summing Is1-Is5 and Os1-Os5 datasets respectively are shown in each graph of FIG. 7. Besides the exterior walls of the building 50 (gypsum walls 52 and glass walls 56), the interior walls 54 are identified. In the "Is1+Os1" waveforms apart from the mid-wall reflections, additional responses at 17 ft. are evident due to the signals reflected by a partially-open wooden door and a filing cabinet detected by system 100 at "Os I" location. In the final reconstructed image, this isolated reflection can be attributed by a separate icon in the image indicating an additional scattering object other than the wall, or it can be neglected since its coordinate would not spatially correlate with responses from other scan locations.

Also, in "Is2+Os2" waveforms the mid-wall 54 inside the; building 50 office space is weak. This is due to the fact that a wooden door in between the "Is2" and "Os2" locations was kept open and hence a strong reflected signal at approximately 14 ft was absent.

Figure 8:
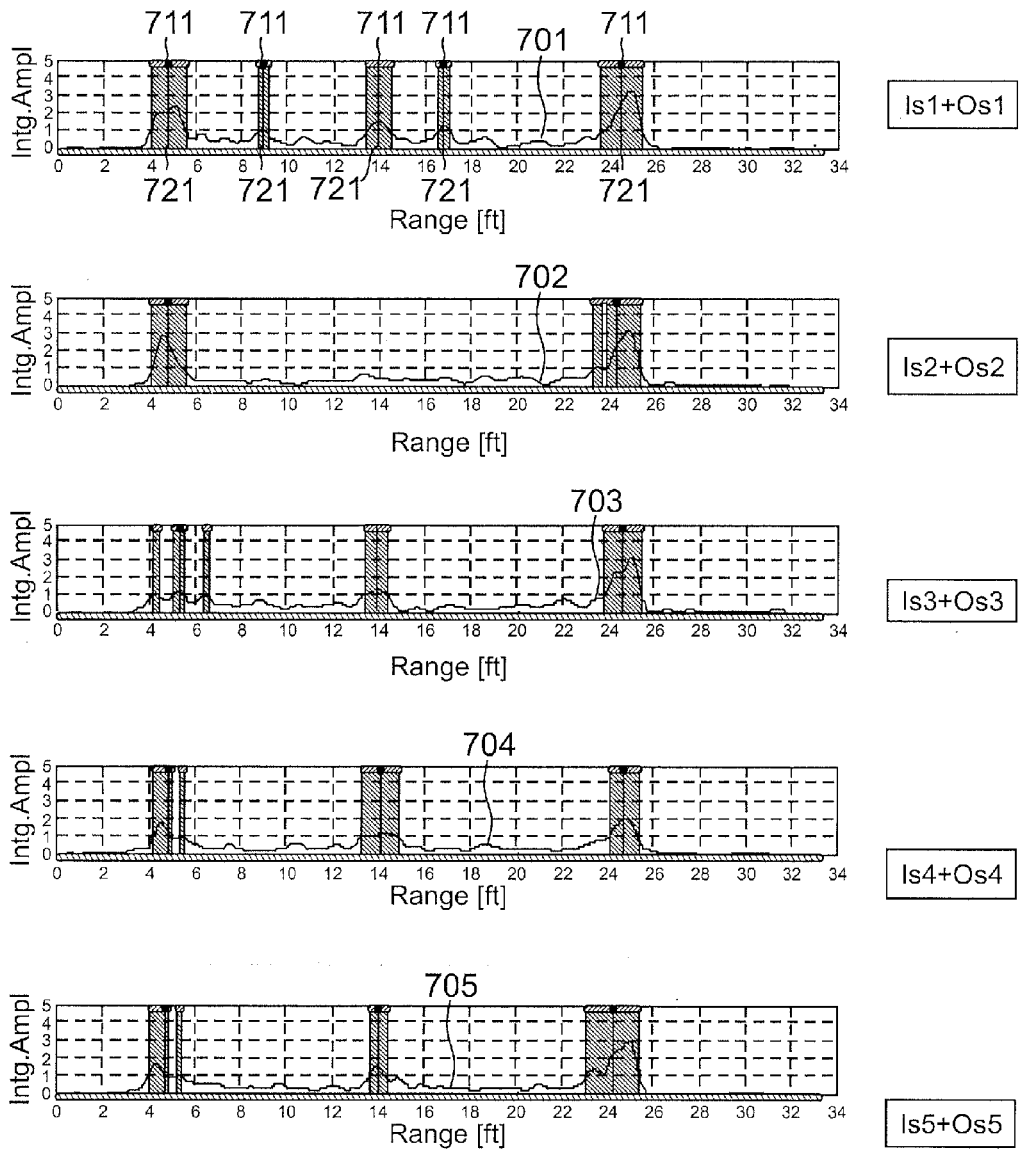
FIG. 8 is a set of signal strength graphs after integration corresponding to responses shown in FIG. 7 in accordance with an embodiment.

FIG. 8 is a set of signal strength graphs after integration corresponding to responses shown in FIG. 7. Further enhancement of the SNR of the waveforms can be achieved at each scan location by summing the successive waveforms. The resultant waveforms, after summing the multiple (e.g., 30 for the present example) waveforms shown in FIG. 7 at each scan location, followed by a N-tap moving average filter, are shown in FIG. 8 (plots 701, 702, 703, 704, 705). The moving average filter may be used to further smooth the noise in the summed waveforms. In this particular example, N has been chosen to be 100. This single, integrated waveform (e.g., each of 701-705) at each scan location can then be used to detect the locations of the walls, based on a suitable threshold (T0). The range-bin whose corresponding amplitude exceeds T0 is considered for a possible wall location. In the present example, a fixed threshold value of 1.0 is used, and the results of the detector output are shown (e.g., shaded areas 711) for each scan location in FIG. 8. As seen in FIG. 8, clusters of shaded markers (e.g., shaded areas 711) are observed. As a next step, each cluster 711 is assigned a single marker 721 at the center of each cluster 711, based on the criterion that clusters 711 of markers are separated from each other by at least a distance parameter Rcluster,min. For the present example, Rcluster,min is chosen to be 1 ft, comparable to the range resolution of system 100 (approximately 1 ft). The mean of each cluster 711 is indicated by a center marker 721 on each integrated waveform, the integrated waveforms being denoted by "Is1+Os1", "Is2+Os2", and so on. This center marker 721 may correspond to an estimated wall location. It should be noted that in the present example a fixed threshold (T0) has been used to estimate the wall coordinates. An adaptive threshold detector, based on cell-averaging constant false alarm rate (CFAR detector), can be used as well to estimate the wall locations based on a given false rate. A higher CFAR threshold implies missed detection of wall locations, whereas a lower CFAR threshold implies an increased probability of false estimation of wall locations, especially when multiple time-delayed reflections from static objects (clutter) inside the rooms are present.

Figure 9B:
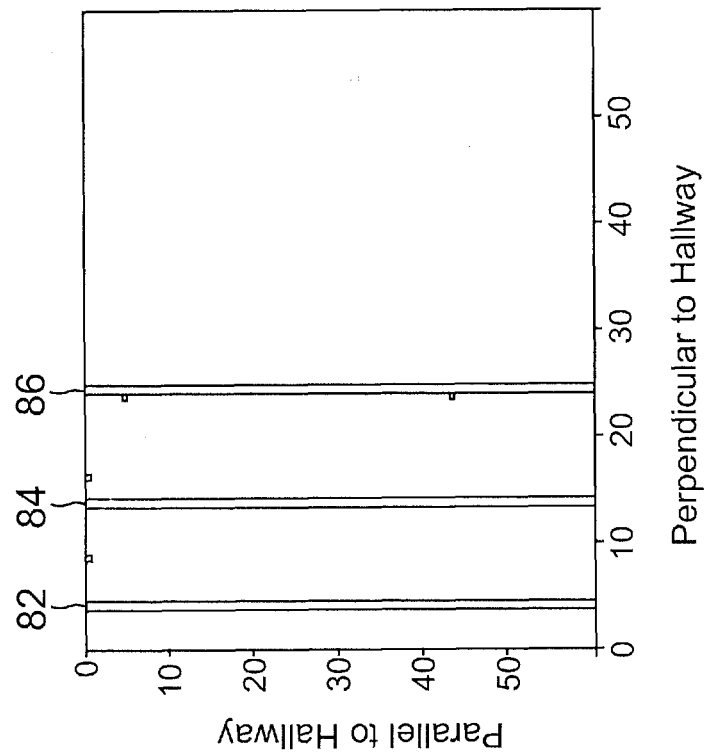
FIG. 9A and FIG. 9B are a pair of displays showing estimated and interpolated wall coordinates obtained from marker locations shown in FIG. 8 in accordance with one embodiment.
Figure 9A:
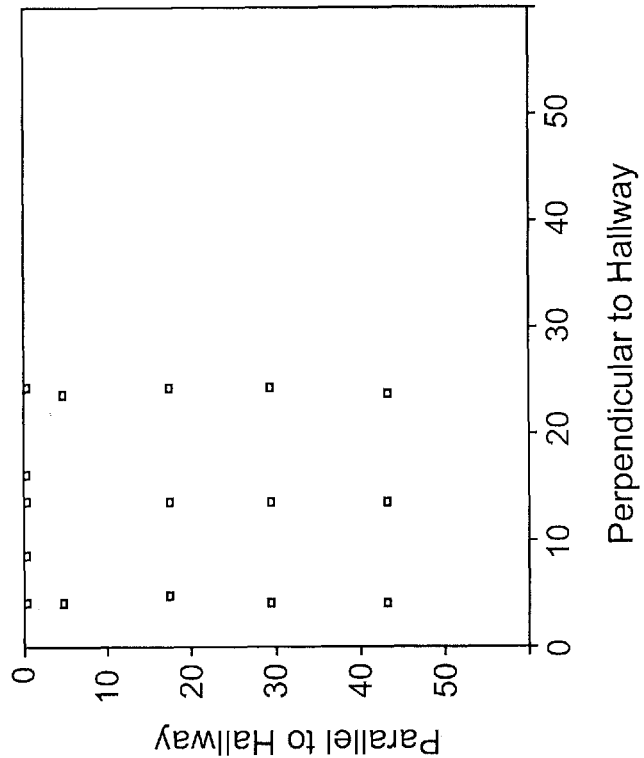

FIG. 9A and FIG. 9B are a pair of displays showing estimated and interpolated wall coordinates obtained from marker locations shown in FIG. 8. Once the markers 721 corresponding to estimated wall locations are generated, a 2-dimensional "binary" image is formed with coordinates on the image grid (e.g., origin O, X-axis, Y-axis shown in FIG. 4) having coordinates of these markers 721. Such an image is shown in FIG. 9A. FIG. 9A shows white pixels (value=1) corresponding to marker 721 coordinates and black pixels (value=0) corresponding to absence of any wall or other static object. The X-Y coordinate frame used for this imaging is shown in FIG. 4, with the scan location "Is1" as the origin O. Dimensions of each pixel in X and Y axes are chosen, for this example, to be 0.63 ft., i.e. 100 times the range-bin size of 0.0063 ft in the raw waveforms. Also, the size of the image grid along each axis is chosen to be at least greater than the maximum extent of the scans along that axis plus the stand-off distance of the radar unit 102 from the wall being scanned of building 50. In the present example, the image grid is chosen to be square with each side equal to 60 ft.

With the image grid populated with the wall-coordinate pixels (e.g., white pixels shown in FIG. 9A) estimated from multiple scan locations parallel to the long hallway, the walls parallel to the hallway (e.g., walls 52, 54, 56) may be demarcated by straight lines 82, 84, 86 using a suitable criterion. This criterion is such that if the number of "white" pixels along "parallel to hallway" axis (X-axis) at a fixed pixel location on the "perpendicular to hallway" axis (Y-axis) exceeds some specified number (Np), then a straight line indicating the wall location is drawn at the specific "perpendicular to hallway" (Y-axis) pixel for which the line passes through these pixels (e.g., the multiple "white" pixels along "parallel to hallway" axis). Three straight lines 82, 84, 86 are obtained with Np=3. The walls corresponding to lines 82, 84, 86 are the front gypsum-walls 52, middle gypsum-walls 54, and the glass-walls 56 seen in FIG. 4.

Figure 10:
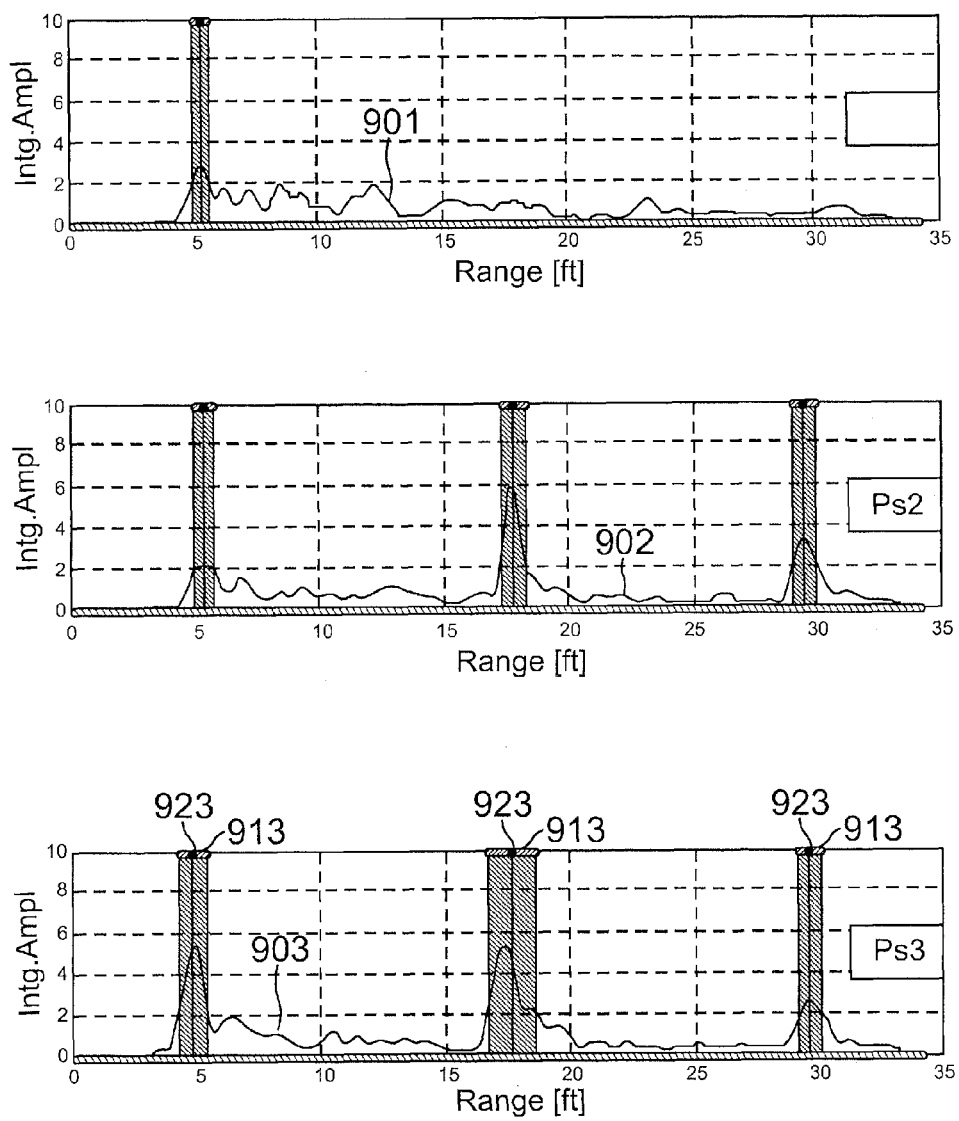
FIG. 10 is a set of signal strength graphs after integration corresponding to responses shown in FIG. 6 in accordance with an embodiment.

FIG. 10 is a set of signal strength graphs after integration corresponding to responses shown in FIG. 6. Similar signal processing steps to those described with reference to FIG. 8 can be carried out to generate the wall image from the data recorded on the "perpendicular to hallway" axis (Y-axis). The integrated waveforms, after summing the multiple (e.g., 30 for the present example) waveforms shown in FIG. 6 at each scan location Ps1, Ps2, and Ps3, followed by a 100-*tap* moving average filter, are shown in FIG. 10 (plots 901, 902, 903). A fixed threshold value of T0=2.0 is used for this example, and the results of the detector output are shown as shaded clusters 913 of markers for each scan location. An adaptive CFAR detector can also applied for this example. The mean of each "shaded cluster" 913 is demarcated by a center marker 923 indicating the estimated wall location along "perpendicular to the hallway" axis (Y-axis). Note that in the "Ps1" data, the response at the true location of the back-wall of the restroom (RR) (e.g., wall 62) is obscured by multiple echoes due to metallic toilet aisles located closer to radar unit 102 in the boresight direction. The Ps2 and Ps3 integrated waveforms, however, more clearly indicate the locations of the walls 62, 64 due to absence of strong reflecting clutter in front of the middle walls.

FIG. 1 IA and FIG. 11B are a pair of displays showing estimated and interpolated wall coordinates obtained from marker locations shown in FIG. 10. With markers 923 assigned to the estimated wall locations, a 2-dimensional "binary" image is formed with these marker coordinates, similar to the description given with reference to FIGS. 9A and 9B. Such an image is shown in FIG. 11A, on the same X-Y coordinate frame used for FIGS. 9A and 9B. With Np set to 2, three straight lines 1002, 1004, 1006 indicating the wall locations drawn at a specific pixel on the "parallel to hallway" axis (X-axis) are obtained as shown in FIG. 11B.

FIG. 12 is a display showing estimated wall locations based on combining the images from displays shown in FIGS. 9A and 9B and FIGS. 11A and 11B. A 2-dimensional image of reconstructed walls in the building 50 may be generated by adding the images from FIG. 9B and FIG. 11B. If any pixel value after addition exceeds the value 1, its value is set to 1. That way the image contains only binary valued pixels. The resultant image is shown in FIG. 12. Except the rear wall of the restroom (denoted by "RR back-wall"), the locations of front and back walls of the office space "C", all the walls of unit "B", and front and mid-walls of the restroom ("RR") have been correctly identified. The mid-walls of "C" could not be detected since they were outside the radar unit 102 unambiguous range.

Figure 13:
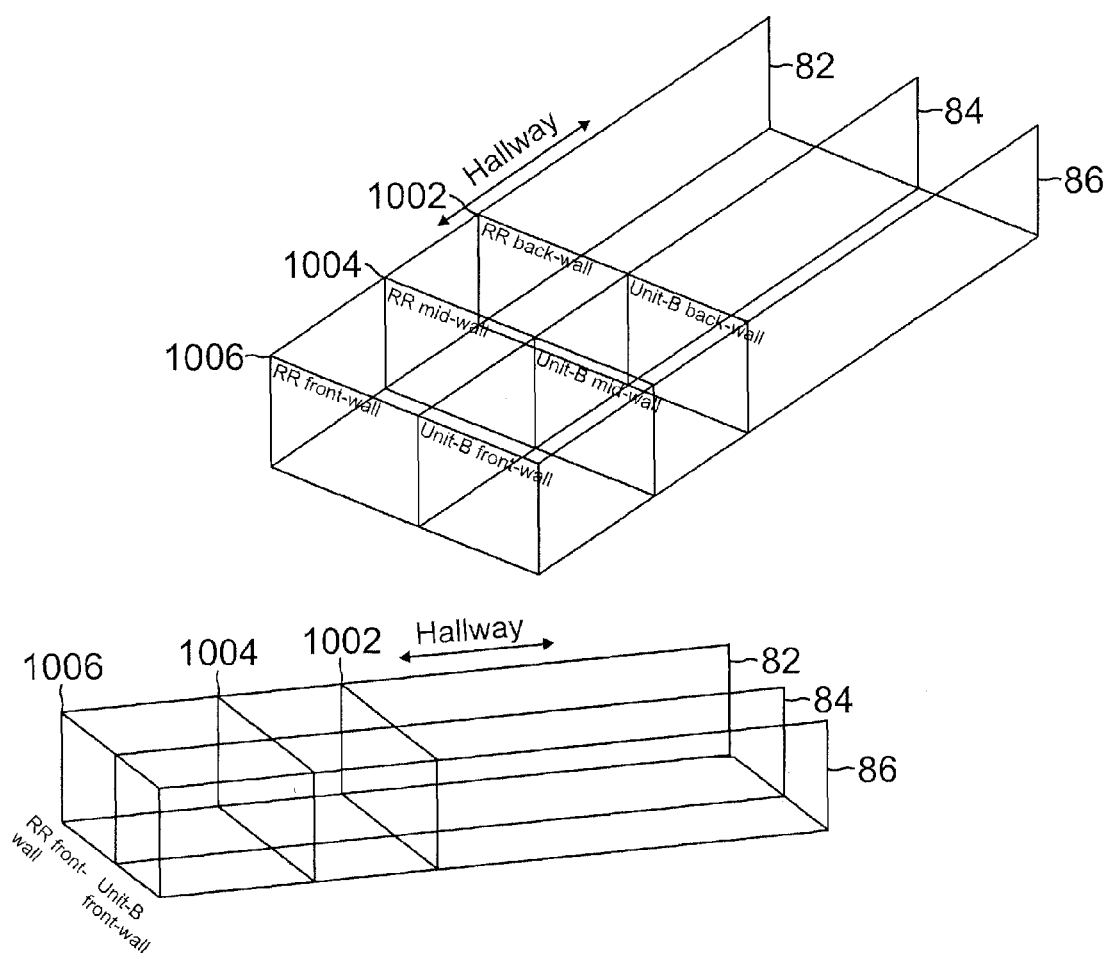
FIG. 13 is a pair of 3-dimensional modeling images of inside walls of the building shown in FIG. 4 in accordance with an embodiment.

FIG. 13 is a pair of 3-dimensional modeling images of inside walls of the building 50 shown in FIG. 4. The 2-dimensional image of estimated wall locations, as shown in FIG. 12, may be used to generate a 3-dimensional image of the building 50. By first populating all the pixels in the 3-dimensional image space with arbitrary fixed values, 2-dimensional slices (planes) are extracted at specific values of X and Y where the wall locations are estimated in FIG. 12 and Z=0. Using Matlab® functions used for rendering 3-dimensional surface images based on 2-dimensional data, the final 3-dimensional image of the wall locations of the building 50 is shown in FIG. 13 for two different view-angles. The images may be drawn to scale in 3 dimensions.

Figure 14A:
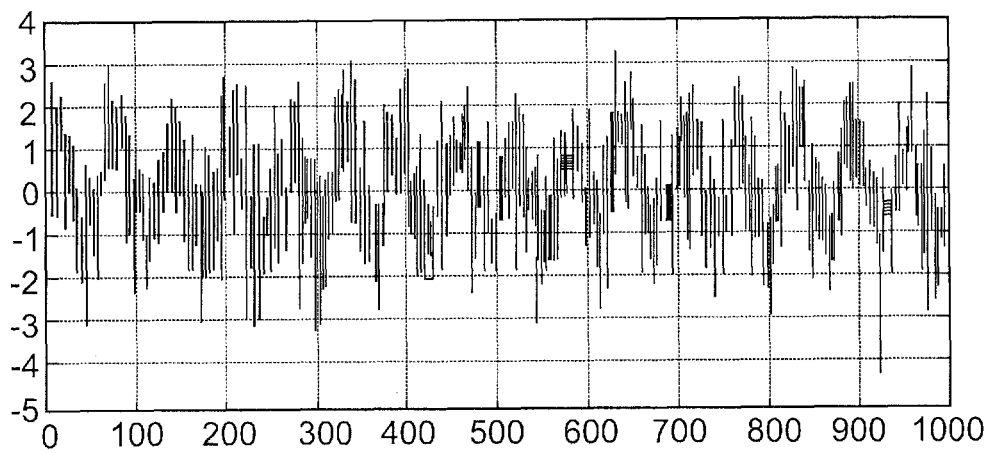
FIG. 14A and FIG. 14B are a pair of spectrum graphs showing analysis of a noisy, low frequency signal, in accordance with an embodiment.
Figure 14B:
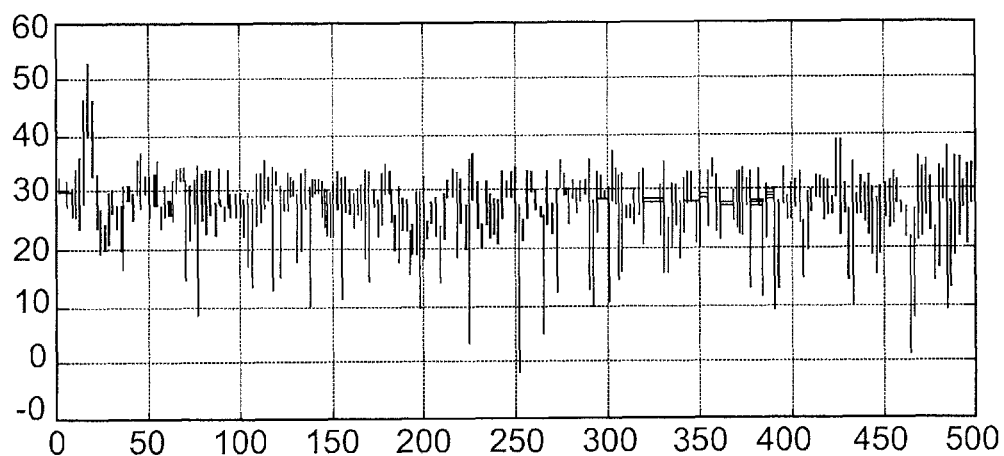

FIG. 14A and FIG. 14B illustrate analysis of a noisy, low frequency signal, in accordance with an embodiment. FIG. 14A shows a noisy low-frequency signal such as may be obtained from a scan of human heartbeat and breathing. FIG. 14B shows the resulting spectrum using a 1024 points DFT to process the signal of FIG. 14 A. By employing radar scans on a target area, potential threats can be identified by examining the spectral contents of the scan, such as shown in FIG. 14A. Human heartbeat and breathing are repetitive and can potentially be detected in the presence of non-periodic clutter such as moving foliage between the radar and the target. The period of the human heartbeat is typically about 1 second, corresponding to the frequency of 1 Hz. The breathing rate is lower, typically 0.5 Hz or less. The clutter is assumed to be non-periodic in these two frequency ranges and above the Nyquist frequency to eliminate aliasing problems. The spectral contents of a radar scan can be found by employing the Discrete Fourier Transform (DFT) on the radar signal during successive scans. By observing the magnitude of the DFT output, the frequency contents of the scan can be determined. The quality of the spectral analysis is proportional to the number of time domain samples available at the DFT input. Doubling the number of input samples doubles the observation time but increases the signal-to-noise ratio by 3 dB.

Figure 15A:
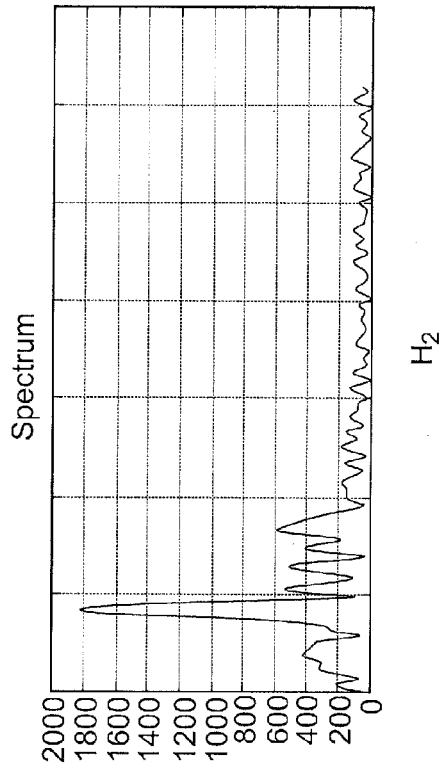
FIG. 15A is an RF radar scan graph paired with a frequency spectrum graph showing heartbeat for an individual, in accordance with an embodiment.
Figure 15A:
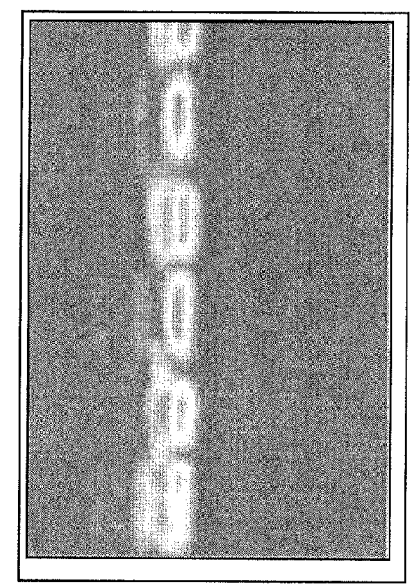

FIG. 15A is an RF radar scan graph paired with a frequency spectrum graph showing heartbeat for an individual, in accordance with an embodiment. The left portion of FIG. 15A shows a graph of a dynamic scan from one of sensors 106 of a person breathing at a relatively normal rate and intensity. The row of the graph with the maximum energy corresponds to a distance of 12.7 ft. from the sensor 106. The right portion of FIG. 15A displays the resulting output of DFT processing (DFT magnitude) indicating that the breathing frequency is approximately 0.4 Hz. Note that the sampling frequency (i.e. scanning frequency) in this case was 6.2 Hz extending the range of the spectral analysis to 3.1 Hz assuming no aliasing.

Figure 15B:
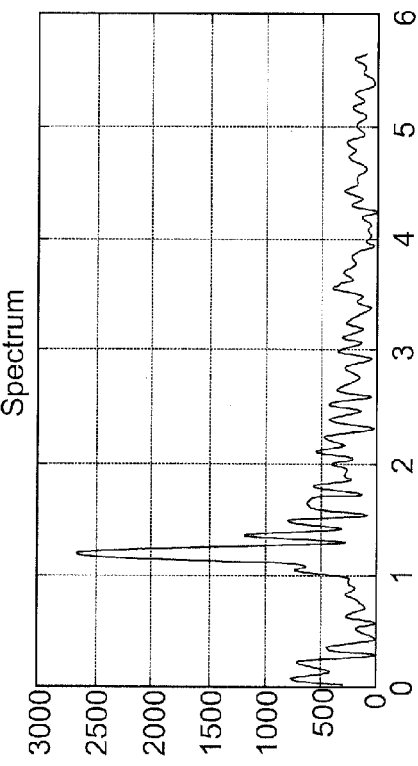
FIG. 15B is an RE radar scan graph paired with a frequency spectrum graph showing breathing for an individual, in accordance with an embodiment.
Figure 15B:
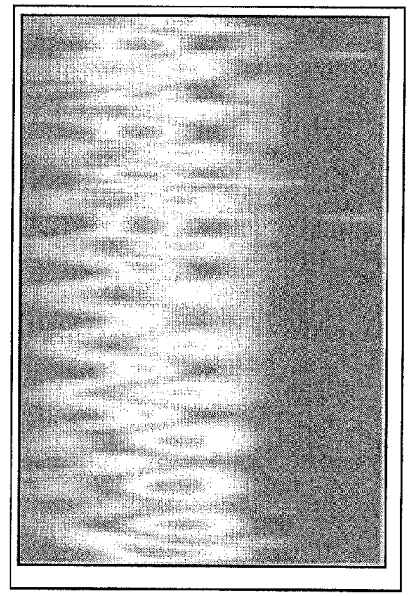

FIG. 15B is an RF radar scan graph paired with a frequency spectrum graph showing breathing for an individual, in accordance with an embodiment.

The left portion of FIG. 15B shows a graph of a dynamic scan of a person holding his breath to emphasize the heartbeat detection, and in this case the row of the graph with the maximum energy corresponds to a distance of 9.3 ft. from the sensor 106. The resulting spectrum of DFT processing (DFT magnitude) is also shown in right portion of FIG. 15B, indicating a heart rate of about 1.2 Hz.

Figure 16:
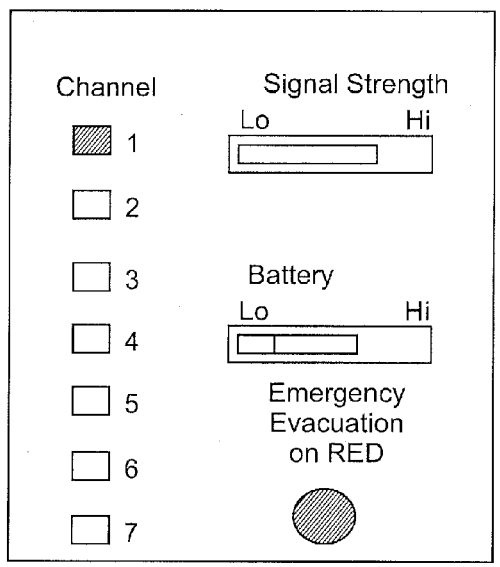
FIG. 16 is an example of a display screen for a wearable communicator unit of a tracking and communications system, in accordance with an embodiment.

FIG. 16 is an example of a display screen for a wearable communicator unit 102 of a tracking and communications system 100, in accordance with an embodiment. Wearable communicator units 102 may include a capability for sense-through-the-wall radar detection of subjects 110. A wearable communicator unit 102 radar may detect and display the presence of a person (e.g., subject 110) through a wall on a glass or goggle mounted screen (see, e.g., FIG. 2, FIG. 3, and FIG. 17. A processor unit of wearable communicator unit 102 may wirelessly transmit the display content, which may be presented inside the helmet of first responder team members 104. Visual display of the layout of building 108 and relative position of the team members 104 can provide the situational awareness and connectivity that are required for carrying out a safe rescue operation. Wearable communicator units 102 may include Bluetooth to transmit the screen content to be displayed on a goggle and can also be used for the communicator unit 102 processor to address display and voice communications.

UWB technology may be used to enable wearable communicator units 102 to combine fast, pulsed radio frequency (RF) time-of-fight ranging and covert communication. UWB radar has measuring capability using two different techniques for assessing the distance between devices. One is "two-way time-of-arrival" (TW-TOA) which offers high accuracy measurements as well as an estimate of the accuracy of each TW-TOA measurement. Such estimates can be used by a Kalman filter to more accurately report location. With TW-TOA, a wearable communicator unit 102 may send a range request to another wearable communicator unit 102, which acknowledges the request with a range response. The initiating communicator unit 102 uses the response information to calculate the intervening distance with an accuracy of 2 cm. In clear line-of-sight (LOS) conditions, the communicator unit 102 can also provide a coarse range estimate (CRE). This measure may be based on the signal strength of the first arriving energy and may be periodically recalibrated with "two-way time-of-flight" (TW-TOP) measurements. While not as accurate as TW-TOA, CRE measurements can be used to increase system capacity by up to a factor of 7.

Unlike ultrasonic or laser-based ranging techniques, UWB pulses can travel through walls and dense foliage. Also, unlike conventional narrow-band RF, UWB pulses do not suffer from errant multi-path reflections—the most direct path through the environment is measured.

Examples of maximum ranging interval and associated wave travel time are shown in Table 1.

TABLE 1

| | |
|---|---|
| 35 m | 6.5 ms |
| 60 m | 8.5 ms |
| 88 m | 12.5 ms |
| 125 m | 20 ms |
| 177 m | 36 ms |
| 250 m | 67 ms |
| 354 m | 132 ms |

By changing the number of pulses used in integration of a radio symbol or a scan point, the communicator unit 102 can act as a point-to-point data link (UWB radio). The larger integration values result in a higher signal-to-noise ratio (SNR) with longer distance operation at the expense of slower ranging and data rates. Table 2 demonstrates the data transmission rate vs. distance with transmit power of −14.5 dBm (decibels normalized to milliwatts).

TABLE 2

| | |
|---|---|
| 35 m | 632 k |
| 60 m | 316 k |
| 88 m | 158 k |
| 125 m | 79 k |
| 177 m | 39.5 k |
| 250 m | 19.7 k |
| 354 m | 9.86 k |

Seven separate and independent communications channels may be provided, for example, in a wearable communicator unit 102. Each communicator unit 102 radio may only support one channel at a time. Radios receiving on a particular code channel will not hear those transmitting on a different channel. These channels allow the user (e.g., the first responder team) to implement a code-division multiple access (CDMA) network supporting up to 7 different "cells", or a unique beacon code used for coordination which does not interfere with sub-cells. A benefit of such capability is to address quality of service (QOS) or prioritization of channels between the team leader (e.g., commander 105) and members (e.g., team members 104). FIG. 16 shows an example of a screen display for communicator unit 102 that can be selected to establish VOIP priority within the organization (e.g., the first responder team), and a set of alarm indicators.

Figure 17:
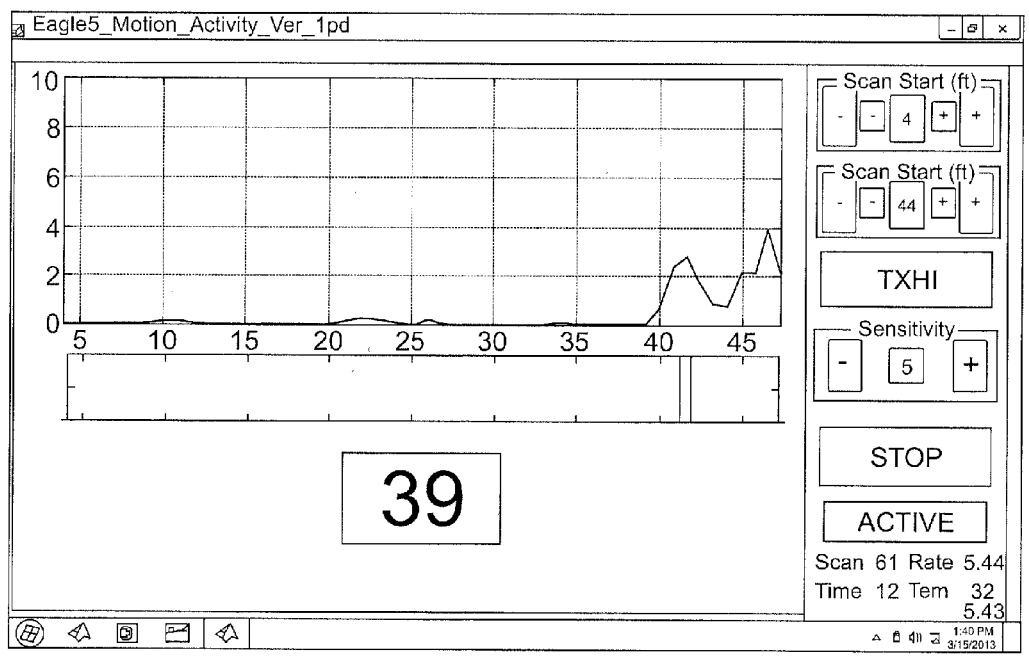
FIG. 17 is another example of a display screen for a wearable communicator unit of a tracking and communications system, in accordance with an embodiment.

FIG. 17 is another example of a display screen for a wearable communicator unit of a tracking and communications system, in accordance with an embodiment. Each sensor (e.g., each wearable communicator unit 102) may have an integrated processor with a specific encrypted identification (ID) (e.g., active tag) and an assigned IP address for its WiFi. Additionally, remote access and control software may provide an ad-hoc connection that requires exchange, for example, of Wi-Fi Protected Access (WPA) keys. FIG. 17 shows an example of a screen from a single sensor (e.g., wearable communicator unit 102) behind three office walls detecting movement of a person. The ad-hoc network (e.g., wireless link 112) may support less than 30 ft. radius in WiFi mode for a single node. In a chain of users, however, such range is extended by a multiplier of users at its maximum covered range.

Embodiments described herein illustrate but do not limit the disclosure. It should also be understood that numerous modifications and variations are possible in accordance with the principles of the present disclosure. Accordingly, the scope of the disclosure is best defined only by the following claims.

What is claimed is:

1. A system comprising:
a plurality of active tags, each active tag having an identification;
a plurality of wearable communicator units in communication with each other, each wearable communicator unit associated with one of the plurality of active tags, and each wearable communicator unit comprising a display; and
a plurality of sensor units comprising an ultra-wideband (UWB) radar imaging system, wherein each of the plurality of sensor units is in communication with at least one of the plurality of wearable communicator units, and wherein the plurality of sensor units is configured to:
operate in a static mode that gathers information to depict a layout of a field of operations;
communicate a layout depiction to at least one of the plurality of wearable communicator units;
operate in a dynamic mode that searches for motion of a subject using edge detection based on a depth resolution of about 3 picoseconds of the UWB radar imaging system, reads at least one of the active tags associated with at least one of the plurality of wearable communicator units, and locates a position of the at least one wearable communicator unit; and
communicate a position of the subject and the position of the at least one wearable communicator unit on the layout depiction to the at least one wearable communicator unit, wherein
the at least one wearable communicator unit displays the layout depiction, a subject location on the layout depiction, a wearable communicator unit location on the layout depiction, and active tag identification information on a display of the at least one wearable communicator unit.

2. The system of claim 1, wherein:
the ultra-wideband (UWB) radar imaging system is configured to detect obstructions and configured to detect the subject.

3. The system of claim 1, wherein each of the plurality of sensor units further comprises:
an active tag reader configured to read any of the active tags associated with one of the plurality of wearable communicator units.

4. The system of claim 1, wherein wherein each of the plurality of sensor units is configured to locate a precise position of each wearable communicator unit using triangulation from the known positions of the plurality of sensor units.

5. The system of claim 1, wherein:
the ultra-wideband (UWB) radar imaging system is configured to detect movement and breathing of the subject.

6. The system of claim 1, wherein at least one of the plurality of sensor units further comprises:
a locator processing unit, wherein each wearable communicator unit includes a display of grid location relative to a grid computed by the locator processing unit.

7. The system of claim 1, further comprising:
a global positioning system (GPS) unit included in each of the plurality of sensor units and configured to provide location information for each sensor unit; and
a GPS unit included in each of the plurality of wearable communicator units and configured to provide location information for each wearable communicator unit.

8. The system of claim 1, wherein the display of the layout depiction, and subject and communicator location and active tag identification information includes:
graphical information identifying the locations of communicator units;
graphical information identifying the locations of subjects; and
a two dimensional display of the locations of communicator units and subjects mapped on the layout information in real-time.

9. The system of claim 1, wherein each of the plurality of sensor units further comprises:
an ultra-wideband (UWB) radar imaging system; and
the UWB radar imaging system includes a wafer scale beam forming antenna array wherein the maximum dimension of the antenna array is less than 5 inches.

10. A method comprising:
communicating among a plurality of team members using a plurality of wearable communicator units wherein each of the plurality of team members is provided one of the plurality of wearable communicator units;
providing an active tag in proximity to each wearable communicator unit for each team member wherein each active tag has an identification;
positioning a plurality of sensor units, comprising an ultra-wideband (UWB) radar imaging system, about a field of operations, and wherein the sensor units are configured to communicate with the plurality of wearable communicator units;
operating the plurality of sensor units in a static mode that gathers information to depict a layout of the field of operations;
communicating a depiction of the layout to at least one of the plurality of wearable communicator units;
operating the plurality of sensor units in a dynamic mode that searches for motion of a subject using edge detection based on a depth resolution of about 3 picoseconds of the UWB radar imaging system, and reads an active tag of each wearable communicator unit;

locating a position of the subject and a position of the at least one wearable communicator unit;

communicating the subject position and the position of the at least one wearable communicator unit on the layout depiction to the at least one wearable communicator unit; and displaying, on a display of the at least one wearable communicator unit, the layout depiction, the subject position on the layout depiction, and the position of the at least one wearable communicator unit on the layout depiction.

11. The method of claim 10, further comprising:
detecting obstructions using the ultra-wideband (UWB) radar imaging system.

12. The method of claim 10, further comprising:
reading at least one of the active tags with an active tag reader provided to at least one of the plurality of wearable communicator units.

13. The method of claim 10, further comprising:
locating a position of at least one wearable communicator unit by performing triangulation from the positions of the plurality of sensor units.

14. The method of claim 10, further comprising:
detecting movement and breathing of the subject using the ultra-wideband (UWB) radar imaging system.

15. The method of claim 10, further comprising:
displaying on the display of the at least one wearable communicator unit a grid location of each active tag relative to a grid computed by a locator processing unit included in at least one of the plurality of sensor units and communicated to the at least one wearable communicator unit.

16. The method of claim 10, further comprising:
acquiring location information for each sensor unit from a global positioning system (GPS) unit included in each of the plurality of sensor units; and
providing location information for each wearable communicator unit from a GPS unit included in each of the plurality of wearable communicator units.

17. The method of claim 10, further comprising:
including in the display of the layout depiction:
graphical information identifying the locations of the plurality of wearable communicator units;
graphical information identifying the location of the subject; and
a two dimensional display of the locations of the plurality of wearable communicator units and the subject mapped on the layout depiction in real-time.

18. The method of claim 10, further comprising:
forming a UWB radar beam, by the UWB radar imaging system, using a wafer scale beam forming antenna array wherein the maximum dimension of the antenna array is less than 5 inches.

* * * * *